(12) United States Patent
Kang

(10) Patent No.: US 11,870,026 B2
(45) Date of Patent: *Jan. 9, 2024

(54) LITHIUM SECONDARY BATTERY

(71) Applicant: SK INNOVATION CO., LTD., Seoul (KR)

(72) Inventor: Hee-Gyoung Kang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,330

(22) Filed: Jul. 16, 2021

(65) Prior Publication Data

US 2021/0344068 A1 Nov. 4, 2021

Related U.S. Application Data

(60) Continuation of application No. 16/254,185, filed on Jan. 22, 2019, now Pat. No. 11,114,717, which is a
(Continued)

(30) Foreign Application Priority Data

Oct. 7, 2015 (KR) .......................... 10-2015-0140742

(51) Int. Cl.
*H01M 10/052* (2010.01)
*H01M 50/183* (2021.01)
(Continued)

(52) U.S. Cl.
CPC ....... *H01M 10/052* (2013.01); *H01M 50/183* (2021.01); *H01M 50/176* (2021.01);
(Continued)

(58) Field of Classification Search
None
See application file for complete search history.

(56) References Cited

U.S. PATENT DOCUMENTS

2014/0106201 A1* 4/2014 Otsuka ................. H01M 50/10
429/162
2014/0356687 A1* 12/2014 Heo ..................... H01M 10/425
429/121
(Continued)

FOREIGN PATENT DOCUMENTS

| JP | 2007-258071 A | 10/2007 |
| KR | 10-2011-0053835 A | 5/2011 |
| KR | 10-2014-0147041 A | 12/2014 |

OTHER PUBLICATIONS

Ahn (KR 1020120080148) (a raw machine translation) (Abstract, Detailed Description & Drawings) (Aug. 17, 2012) (Year: 2012).*
(Continued)

*Primary Examiner* — Carmen V Lyles-Irving
(74) *Attorney, Agent, or Firm* — IP & T GROUP LLP

(57) ABSTRACT

The present invention provides a lithium secondary battery which includes an electrode assembly to which an electrode tap is attached, an electrode tap receptor configured to house a portion of the electrode assembly such that a portion of the electrode tap protrudes to an outside, and a case configured to surround the electrode assembly and seal the electrode assembly together with the electrode tap receptor, wherein the electrode tap receptor includes a gas barrier layer.

9 Claims, 2 Drawing Sheets

Related U.S. Application Data division of application No. 15/288,535, filed on Oct. 7, 2016, now Pat. No. 10,224,520.

(51) Int. Cl.
    *H01M 50/538* (2021.01)
    *H01M 50/176* (2021.01)
    *H01M 50/179* (2021.01)

(52) U.S. Cl.
    CPC ........ *H01M 50/179* (2021.01); *H01M 50/538* (2021.01); *H01M 2220/20* (2013.01); *Y02E 60/10* (2013.01)

(56) References Cited

U.S. PATENT DOCUMENTS

| | | | |
|---|---|---|---|
| 2015/0270530 A1* | 9/2015 | Thoennessen | H01M 50/636 29/623.2 |
| 2016/0056421 A1* | 2/2016 | Kim | B32B 27/34 428/354 |

OTHER PUBLICATIONS

Office Action for patent application No. 10-2015-0140742 issued by the Korean Intellectual Property Office dated Jun. 17, 2022.

\* cited by examiner (a)

(b)

LITHIUM SECONDARY BATTERY

CROSS REFERENCE TO RELATED APPLICATIONS AND CLAIM OF PRIORITY

This application is a continuation of U.S. patent application Ser. No. 16/254,185 filed on Jan. 22, 2019, which is a division of U.S. patent application Ser. No. 15/288,535 filed on Oct. 7, 2016 and issued as U.S. Pat. No. 10,224,520 on Mar. 5, 2019, which claims the benefit of Korean Patent Application No. 10-2015-0140742, filed on Oct. 7, 2015. The disclosure of each of the foregoing application incorporated herein in their entirety by reference.

BACKGROUND OF THE INVENTION

1. Field of the Invention

The present invention relates to a lithium secondary battery.

2. Description of the Related Art

Recently, a lithium secondary battery, which is rechargeable and lightweight and has high energy and output densities, has been widely used as an energy source for wireless mobile devices. Further, as alternative means to solve problems of air pollution and greenhouse gases caused from conventional internal combustion engine vehicles using fossil fuels such as a gasoline vehicle and a diesel vehicle, an electric vehicle (EV), a hybrid electric vehicle (HEV), a plug-in hybrid electric vehicle (PHEV), or the like have been proposed. The lithium secondary battery has been researched as a power source for the alternative vehicles to the internal combustion engine vehicles.

The lithium secondary battery is classified into a lithium ion battery using a liquid electrolyte and a lithium polymer battery using a polymer electrolyte depending on a type of electrolyte, and is classified into cylindrical, prismatic, and a pouch shapes depending on a shape of an exterior material in which an electrode assembly is accommodated.

Among these, since the pouch type lithium secondary battery has an appearance that is made of a metal layer (foil) and a pouch film foamed of multi-layers of a synthetic resin layer coated on upper and lower surfaces of the metal layer, the weight thereof may be more remarkably reduced than that of the cylindrical or prismatic lithium secondary battery using a metallic can, such that the pouch type lithium secondary battery may be lightweight and may be modified into various shapes.

However, in spite of the above-described advantages, since there is a limitation on a molding depth of the pouch film in a structural aspect thereof, cracks easily occur in the pouch film itself during a molding process for housing large sized battery cells, and the metallic layer is exposed from the cracked portion, which causes a reduction in life-span of the cells.

In addition, the lithium secondary battery is sealed by molding a case for housing the electrode assembly in a predetermined shape, and by sealing protruding portions of electrode taps. In this case, an unnecessary space is formed in the sealed portion, and thereby causes a reduction in capacity of the battery.

Korean Patent Laid-Open Publication No. 2007-0109080 discloses a pouch type lithium secondary battery having a rounded corner in which a bottom and a side of an electrode assembly housing part foiled at a rear surface of a pouch are met, however, fails to solve the above-described problems.

SUMMARY

Accordingly, it is an aspect of the present invention to provide a lithium secondary battery which may achieve a high-capacity without limitation on a battery thickness, and may have a high volumetric energy density.

In addition, another aspect of the present invention is to provide a lithium secondary battery having excellent reliability of sealing.

Further, another aspect of the present invention is to provide a lithium secondary battery having excellent resistance to permeability, and long-term durability.

In order to accomplish the above aspects, according to an aspect of the present invention, there is provided a lithium secondary battery including: an electrode assembly to which an electrode tap is attached; an electrode tap receptor configured to house a portion of the electrode assembly such that a portion of the electrode tap protrudes to an outside; and a case configured to surround the electrode assembly and seal the electrode assembly together with the electrode tap receptor, wherein the electrode tap receptor includes a gas barrier layer.

In the lithium secondary battery according to an embodiment of the present invention, the electrode tap receptor may be formed in a plurality of layers, and the gas barrier layer may be included in an inner layer of the electrode tap receptor.

In the lithium secondary battery according to an embodiment of the present invention, the gas barrier layer may be formed on a portion which contacts with the electrode assembly.

In the lithium secondary battery according to an embodiment of the present invention, the gas barrier layer may include at least one selected from a group consisting of ethylene-vinyl alcohol copolymer; polyvinylidene chloride; polyvinyl alcohol; nylon; polyamide; polyacrylonitrile, linear low-density polyethylene, ethylene-vinyl alcohol copolymer, and ionomer copolymer; a metal film; a coating layer made of at least one selected from a group consisting of silica, alumina, rubber, metal, glass and amorphous carbon; and a film having a coating layer in which layered silicate nano particles are dispersed in a polyvinyl alcohol binder.

In the lithium secondary battery according to an embodiment of the present invention, the electrode tap receptor may include a predetermined hole through which the electrode tap protrudes to the outside, and an insulation film is disposed between the hole and the electrode tap.

In the lithium secondary battery according to an embodiment of the present invention, the electrode tap receptor may further include an electrolyte storage part.

The lithium secondary battery according to an embodiment of the present invention may further include a sub receptor provided on an opposite surface of the electrode assembly relative to one surface to which the electrode tap is attached to house a portion the electrode assembly including the opposite surface, wherein the sub receptor may include a gas barrier layer.

In the lithium secondary battery according to an embodiment of the present invention, the electrode tap may include a first electrode tap and a second electrode tap which are attached to surfaces of the electrode assembly facing each other, and the electrode tap receptor may include a first electrode tap receptor configured to house a portion of the electrode assembly such that a portion of the first electrode tap protrudes to the outside, and a second electrode tap receptor configured to house a portion of the electrode assembly such that a portion of the second electrode tap protrudes to the outside.

In the lithium secondary battery according to an embodiment of the present invention, a portion in which the case and the electrode tap receptor contact each other may be sealed by an adhesive or thermal fusion bonding.

In the lithium secondary battery according to an embodiment of the present invention, the case may be made of at least one selected from a group consisting of polyethylene, polypropylene, polyethylene terephthalate and polyethylene naphthalate.

Since the lithium secondary battery according to the present invention includes the electrode tap receptors having a specific structure, a formation of sealing parts protruding to an outer surface of the battery, which are indispensable in the conventional pouch type secondary battery, may not be required, and thereby volumetric energy density and stability of the battery may be improved.

In addition, since the lithium secondary battery according to the present invention includes the electrode tap receptors having a specific structure, it is possible to achieve a high-capacity battery having a significantly increased thickness because molding of a case is unnecessary, and reduce defects in insulation resistance of the battery because damaging an insulation layer due to a molding process may be avoided.

Further, since the lithium secondary battery according to the present invention includes the gas barrier layer in the electrode tap receptor, inflowing and outflowing of gases into and from the battery may be prevented due to obtaining resistance to permeability, thereby improving long-term durability.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The present invention discloses a lithium secondary battery which includes: an electrode assembly to which an electrode tap is attached; an electrode tap receptor configured to house a portion of the electrode assembly such that a portion of the electrode tap protrudes to an outside; and a case configured to surround the electrode assembly and seal the electrode assembly together with the electrode tap receptor, wherein the electrode tap receptor includes a gas barrier layer, thereby volumetric energy density and stability of the battery may be improved, because a formation of sealing part protruding to an outer surface of the battery, which are indispensable in the conventional pouch type secondary battery, is not required, and long-term durability thereof may be improved by preventing inflowing and outflowing of gases into and from the battery.

Hereinafter, exemplary embodiments of the present invention will be described in detail with reference to the accompanying drawings. However, since the drawings attached to the present disclosure are only given for illustrating one of various embodiments of present invention to easily understand the technical spirit of the present invention with the detailed descriptions below, it should not be construed as limiting the present invention.

Figure 1:
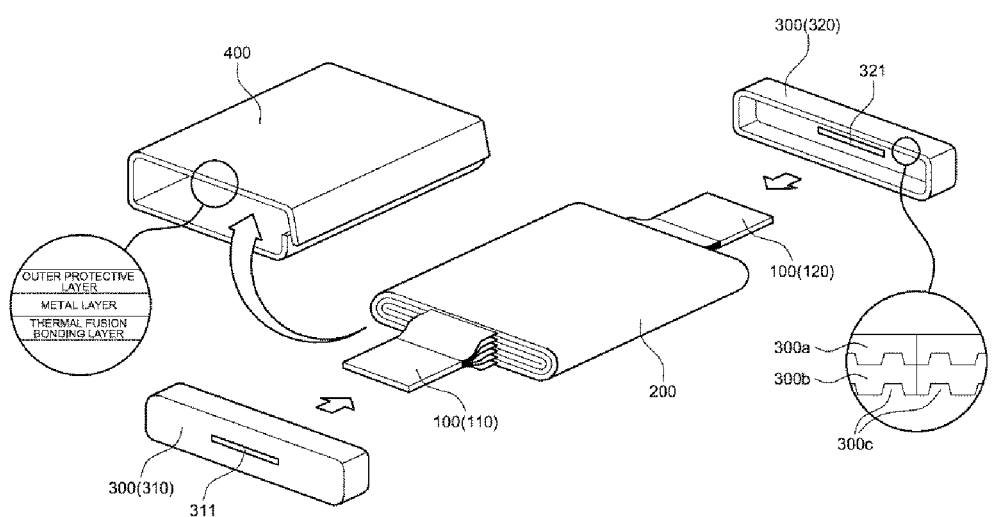
FIG. 1 is a perspective view schematically illustrating a construction of a lithium secondary battery according to an embodiment of the present invention.

FIG. 1 is a perspective view schematically illustrating a construction of a lithium secondary battery according to an embodiment of the present invention.

The lithium secondary battery according to the present invention includes: an electrode assembly 200 to which an electrode tap 100 is attached; an electrode tap receptor 300 configured to house a portion of the electrode assembly 200 such that a portion of the electrode tap 100 protrudes to an outside; and a case 400 configured to surround the electrode assembly 200 and seal the electrode assembly 200 together with the electrode tap receptor 300, wherein the electrode tap receptor 300 includes a gas barrier layer.

Since the lithium secondary battery according an embodiment of the present invention may house the electrode assembly without molding of a case, a high-capacity battery may be manufactured without any limitation in a cell thickness, a damage in insulation resistance of the battery may be reduced because there is no problem of damaging an insulation layer of the case which may occur during a molding process. In addition, since the lithium secondary battery according to an embodiment of the present invention is sealed without sealing parts protruding to an outer surface of the battery, which are indispensable in the conventional pouch type secondary battery, volumetric energy density and stability of the battery may be improved. Further, since the lithium secondary battery according to an embodiment of the present invention includes the gas barrier layer at a portion on which sealing is performed, long-term durability thereof may be improved by preventing inflowing and outflowing of gases into and from the battery.

Electrode Assembly

The electrode assembly 200 according to an embodiment of the present invention has a construction applied to a secondary battery, and includes a cathode plate, an anode plate, a separation film disposed between the cathode plate and the anode plate for insulating the same, and the electrode taps 100 which are electrically connected to the cathode plate and the anode plate, respectively. Sides of the electrode assembly 200 to which the electrode tap 100 is not attached are surrounded by the case 400, and the electrode taps 100 are housed in the electrode tap receptors 300 to protrude to an outside as described below.

According to an embodiment of the present invention, the electrode tap 100 attached to the electrode assembly 200 includes a first electrode tap 110 which may be a cathode tap electrically connected to the cathode plate, and a second electrode tap 120 which may be an anode tap electrically connected to the anode plate. Herein, the first electrode tap 110 and the second electrode tap 120 may be attached to surfaces of the electrode assembly 200 facing each other, respectively (see FIG. 2(a)), or may be attached to the same surface of the electrode assembly 200 as each other (see FIG. 2(b)).

The electrode assembly 200 may have a configuration in which the cathode plate, the separation film, and the anode plate are sequentially arranged and wound in one direction, or a configuration in which a plurality of the cathode plates, the separation films, and the anode plates are repeatedly laminated, but it is not limited thereto.

The cathode plate and the anode plate are coated with a cathode active material and an anode active material, respectively. The cathode active material may include any material so long as it is generally used in the related art without particular limitation thereof. For example, in a case of the lithium secondary battery, the cathode active material may be a lithium-based active material, for example, may include a layered compound such as lithium cobalt oxide ($LiCoO_2$) lithium nickel oxide ($LiNiO_2$) or a compound substituted with one or more transition metal; lithium manganese oxide such as $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni-site type lithium nickel oxide; lithium manganese complex oxide; or the like, but it is not limited thereto.

The anode active material may include any material so long as it is generally used in the related art without particular limitation thereof. More particularly, carbon-based materials such as crystalline carbon, amorphous carbon, carbon composite, carbon fiber, etc., lithium metal, alloys of lithium and other elements, silicon, or tin may be used. The amorphous carbon may include, for example, hard carbon, cokes, mesocarbon microbead (MCMB) calcined at a temperature of 1500° C. or less, mesophase pitch-based carbon fiber (MPCF), or the like. The crystalline carbon may include graphite materials, for example, natural graphite, graphite cokes, graphite MCMB, graphite MPCF, or the like. Other elements used together with lithium to form an alloy may include, for example, aluminum, zinc, bismuth, cadmium, antimony, silicon, lead, tin, gallium or indium, but it is not limited thereto.

A material of the separation film is not particularly limited so long as it is an insulation material, and a material formed of a porous membrane may be preferably used so that ions can pass between the cathode and the anode. For example, an insulating thin film having high ion permeability and mechanical strength may be used. For example, a sheet or non-woven fabric made of an olefin polymer such as hydrophobic polypropylene with chemical resistance; glass fiber; polyethylene, or the like may be used. When using a solid electrolyte such as a polymer as an electrolyte, the solid electrolyte may also serve as the separation film. Preferably, the separation film may be a polyethylene film, a polypropylene film, or a multi-layer film made of a combination of these films; or a polymer film such as polyvinylidene fluoride, polyethylene oxide, polyacrylonitrile, or polyvinylidene fluoride-hexafluoropropylene copolymer, etc.

In addition, the separation film may be a film coated with an inorganic layer on at least one surface of the above-described polymer film. Types of an inorganic material included in the inorganic layer are not particularly limited, but may include, for example, oxides containing at least one metal selected from aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cesium (Ce). For example, the oxide may include $Al_2O_3$, $TiO_2$, $ZrO_2$, $Y_2O_3$, ZnO, CaO, NiO, MgO, $SiO_2$, SiC, $Al(OH)_3$, AlO(OH), $BaTiO_3$, $PbTiO_3$, PZT, PLZT, PMN-PT, $HfO_2$, $SrTiO_3$, $SnO_3$, $CeO_2$, or the like, but it is not limited thereto. These oxides may be used alone or in combination of two or more thereof.

Electrode Tap Receptor

The lithium secondary battery according to an embodiment of the present invention includes the electrode tap receptor 300 which houses a portion of the electrode assembly 200 such that a portion of the electrode tap 100 protrudes to the outside. The electrode tap receptor 300 and the case 400 to be described below surround and seal the electrode assembly 200 together with each other, such that volumetric energy density of the battery may be improved.

In addition, due to the electrode tap receptor 300 including the gas barrier layer, the lithium secondary battery may obtain resistance to permeability, and thereby may achieve long-term durability.

In example embodiments of the present invention, a material of the electrode tap receptor 300 is not particularly limited, but may include a polymer resin generally used in the related art, and a resin capable of being easily injection molded is preferably used. For example, the electrode tap receptor 300 may include at least one selected from a group consisting of polyethylene, polypropylene, polyethylene terephthalate and polyethylene naphthalate, from an aspect of securing the molding workability, sealing properties and insulation properties.

A material of the gas barrier layer according to example embodiments the present invention is not particularly limited, so long as it can secure the resistance to permeability, but may include, for example, at least one selected from a group consisting of ethylene-vinyl alcohol copolymer; polyvinylidene chloride; polyvinyl alcohol; nylon; polyamide; polyacrylonitrile, linear low-density polyethylene, ethylene-vinyl alcohol copolymer, and ionomer copolymer; a metal film; a coating layer made of at least one selected from a group consisting of silica, alumina, rubber, metal, glass and amorphous carbon; and a film having a coating layer in which layered silicate nano particles are dispersed in a polyvinyl alcohol binder.

The electrode tap receptor 300 according to an embodiment of the present invention may be formed in a plurality of layers, and in this case, the gas barrier layer may be included in an inner layer of the electrode tap receptor 300. More particularly, the electrode tap receptor 300 may be formed in a structure in which an outer layer 300a and a gas barrier layer 300b are laminated, and the gas barrier layer 300b may be formed on a portion which contacts with the electrode assembly 200, which is preferable in terms of securing the resistance to permeability.

Referring to FIG. 1, the electrode tap receptors 300 (310 and 320) according to an embodiment of the present invention may house a portion of the electrode assembly 200 to which the electrode taps 100 are attached, and may include a predetermined holes 311 and 321 so that a portion of the electrode taps 100 protrudes to the outside. In order to improve the reliability of sealing, an insulation film may be disposed between the holes 311 and 321 and the electrode taps 110 and 120. In this case, the reliability of sealing as well as insulation properties may be improved.

Figure 2:
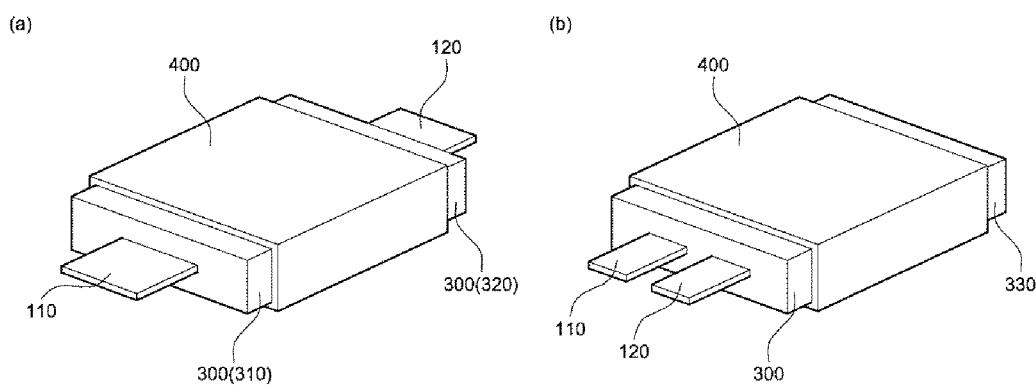
FIGS. 2 and 3 are perspective views schematically illustrating structures of lithium secondary batteries according to embodiments of the present invention.

Referring to FIG. 2(a), in one embodiment of the present invention, when the first electrode tap 110 and the second electrode tap 120 are attached to surfaces of the electrode assembly 200 facing each other, the electrode tap receptor 300 may include a first electrode tap receptor 310 configured to house a portion of the electrode assembly 200 so that a portion of the first electrode tap 110 protrudes to the outside, and a second electrode tap receptor 320 configured to house a portion of the electrode assembly 200 so that a portion of the second electrode tap 120 protrudes to the outside. Herein, the first electrode tap receptor 310 and the second electrode tap receptor 320 may include a first hole 311 and a second hole 321 so that a portion of the first electrode tap 110 and the second electrode tap 120 protrudes to the outside, respectively.

Referring to FIG. 2(b), in another embodiment of the present invention, when the first electrode tap 110 and the second electrode tap 120 are attached to any one surface of the electrode assembly 200, the electrode tap receptor 300 may be disposed on one surface of the electrode assembly 200 to which the electrode taps 110 and 120 are attached, and may include two holes so that a portion of the electrode taps 110 and 120 protrude to the outside, respectively. In this case, the lithium secondary battery may further include a sub receptor 330 which is disposed on an opposite surface of the electrode assembly 200 which has no electrode tap formed thereon, and may be formed of the same material as the electrode tap receptor 300. Thus, the sub receptor 330 may seal the electrode assembly 200 together with the case 400.

The electrode tap receptor 300 according to an embodiment of the present invention may seal the electrode assembly 200 together with the case 400. To improve the reliability of sealing, a portion in which the electrode tap receptor 300 and the case 400 contact each other may be sealed through an adhesive, or may be sealed by thermal fusion bonding.

Meanwhile, in the lithium secondary battery, the electrolyte inside the battery is consumed due to repeated charging and discharging. In this regard, the electrode tap receptor 300 according to the embodiment of the present invention may further include an electrolyte storage part 300c. Accordingly, when the electrolyte in the battery is consumed, the electrolyte stored in the electrolyte storage part 300c may be used, so that life-span properties of cells may be improved. The electrolyte storage part 300c according to an embodiment of the present invention may be foamed in a portion in which the electrode tap receptor 300 and the electrode assembly 200 contact each other. A shape of the electrolyte storage part 300c is not particularly limited, but may be formed, for example, in a shape of groove at an inner surface of the electrode tap receptor 300 (see FIG. 1)

According to another embodiment of the present invention, when the electrode tap receptor 300 is formed in a plurality of layers including the outer layer 300a and the gas barrier layer 300b, the gas barrier layer 300b may be formed as a portion which contacts the electrode assembly 200, and the electrolyte storage part 300c may be formed in a predetermined groove shape in the gas barrier layer 300b.

Case

The lithium secondary battery according to an embodiment of the present invention includes the case 400 which may surround and seal the electrode assembly 200 together with the electrode tap receptor 300.

In general, the case is molded so as to have a predetermined depth for housing the electrode assembly, and cracks may occur in the case during a molding process to cause a limitation on a molding depth of the case. To solve this problem, the case is manufactured by a process of separately molding upper and lower cases, then sealing these cases. However, in this case, an unnecessary space protruding to an outside is generated in the sealed portion, which causes a reduction in volumetric energy density of the battery.

Meanwhile, since the lithium secondary battery according to an embodiment of the present invention includes the electrode tap receptor 300 having the above-described structure, it is possible to achieve a battery having a significantly increased thickness because the molding process of the case 400 is unnecessary, and reduce a damage in insulation resistance of the battery because there is no problem such as destruction of an insulation layer during the molding process of the case. Further, since the lithium secondary battery according to an embodiment of the present invention is sealed without the sealing part protruding to an outer surface, volumetric energy density and stability of the battery may be improved.

Referring to FIG. 1, the case 400 according to an embodiment of the present invention may be formed by one sheet, and may be formed in a shape having a predetermined size so as to surround the electrode assembly 200. A shape of the case 400 is not particularly limited, but may be appropriately selected according to the shape of the electrode assembly 200 housed therein, and may employ a hollow prismatic, cylindrical shape, or the like.

The case 400 may seal the electrode assembly 200 together with the above-described electrode tap receptor 300. In example embodiments, the case 400 may house the electrode assembly 200 therein while surrounding the sides of the electrode assembly 200 to which the electrode tap 100 is not attached, and the electrode tap receptors 310 and 320 house the portions of the electrode assembly 200 to which the electrode taps 100 are attached, such that the case 400 and the electrode tap receptors 310 and 320 may seal the electrode assembly 200.

Figure 3:
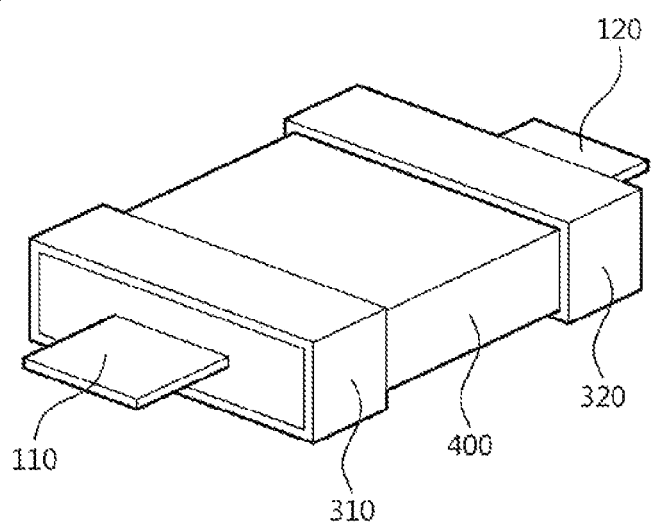
Figure 3:
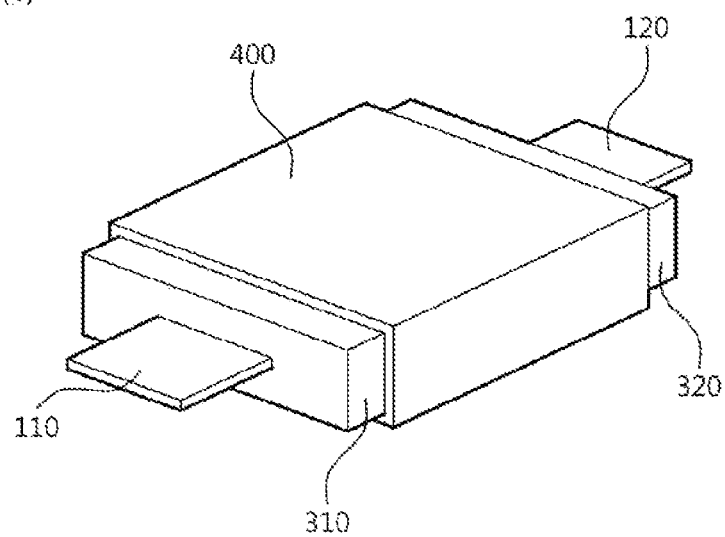

FIG. 3 include perspective views schematically illustrating a structure of sealing the electrode assembly by the electrode tap receptor 300 and the case 400 in the lithium secondary battery according to embodiments of the present invention.

Referring to FIG. 3(a), the case 400 may be firstly formed so as to surround the sides of the electrode assembly 200 to which the electrode taps 110 and 120 are not attached, then the electrode tap receptors 310 and 320 may be disposed on the case 400 so as to overlap the portions of the electrode assembly 200 to which the electrode taps 110 and 120 are attached. In this case, the portions in which the case 400 and the electrode tap receptors 310 and 320 contact each other may be sealed by using an adhesive or performing additional thermal fusion bonding in order to improve reliability of sealing.

Referring to FIG. 3(b), the electrode tap receptors 310 and 320 may be firstly disposed at the portions of the electrode assembly 200 to which the electrode taps 110 and 120 are attached, and then the case 400 may be formed thereon so as to surround the electrode assembly 200. Also in this case, the portions in which the case 400 and the electrode tap receptors 310 and 320 contact each other may be sealed by using an adhesive or performing additional thermal fusion bonding in order to improve reliability of sealing.

Any structure and material generally used in the related art may be employed for the case 400 according to embodiments of the present invention without particular limitation thereof. For example, the case 400 may have a structure formed by laminating a thermal fusion bonding layer, a metal layer, and an outer protective layer.

The outer protective layer according to an embodiment of the present invention may prevent a damage or corrosion of the metal layer, and also prevent the metal layer from being electrically connected with an external object.

The outer protective layer may have a single film structure made of any one material selected from a group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyallylate, Teflon and glass fiber; or a complex film structure made of two or more of the above materials.

Among the above materials, polyethylene terephthalate, and nylon are preferably used, and the nylon layer may be a bi-axially stretched nylon layer.

When the outer protective layer according to an embodiment of the present invention has the complex film structure including two or more layers, each layer may be coupled with each other through adhesive layers. In this case, a material of the adhesive layer is not particularly limited so long as it is used in the related art, and the adhesive layer may preferably have a thickness of 3 µm or less.

The metal layer according to an embodiment of the present invention may block invasion of an external moisture, gas, etc. to the electrode assembly 200, and improve a mechanical strength of an exterior member, as well as prevent chemical substances injected into the exterior member from being discharged to an outside.

A material of the metal layer may include at least one selected from a group consisting of iron, carbon, chromium, manganese, nickel, and aluminum, etc., and may include, for example, any one selected from a group consisting of an alloy of iron, carbon, chromium and manganese, an alloy of iron, chrome and nickel, and aluminum or an equivalent thereof, but it is not limited thereto.

When the metal layer is made of a material containing iron, the mechanical strength thereof may be increased, and when the metal layer is made of a material containing aluminum, flexibility thereof may be enhanced. In this regard, aluminum may be preferably used.

The metal layer may be coupled with other layers forming the exterior member of the present invention, specifically, the outer protective layer, a heating layer or a thermal fusion bonding layer through the adhesive layer. Herein, a material of the adhesive layer is not particularly limited so long as it is used in the related art.

The thermal fusion bonding layer according to an embodiment of the present invention may be melted by heat applied to a peripheral portion of an exterior member film during performing a process of sealing the exterior member film among processes of manufacturing the secondary battery. Similar to the outer protective layer, the thermal fusion bonding layer may have a single film structure made of any one material selected from a group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyallylate, Teflon and glass fiber; or a complex film structure made of two or more of the above materials.

Among the above materials, polyethylene is preferably used. The polyethylene may be used in a structure in which homo-polypropylene and modified polypropylene may be laminated.

When the thermal fusion bonding layer according to an embodiment of the present invention has the complex film structure including two or more layers, each layer may be coupled with each other through the adhesive layer. In this case, a material of the adhesive layer is not particularly limited so long as it is used in the related art.

The case 400 according to an embodiment of the present invention may be formed by one sheet, and may be formed so as to surround the above-described electrode assembly 200. In this case, as illustrated in FIG. 1, portions in which both ends of the case 400 overlap each other may be sealed. For example, the overlapping portion may be sealed by using an adhesive, or by performing additional thermal fusion bonding. A position of the portions in which both ends of the case 400 overlap each other is not particularly limited, and as illustrated in FIG. 1, the both ends of the case 400 may overlap each other and may be sealed at a side portion thereof.

When performing thermal fusion bonding at the overlapping portion, the case 400 may further include a coating layer made of the same material as the above-described thermal fusion bonding layer on an upper surface of the outer protective layer thereof located at a lower side of the overlapping portion. In this case, since the thermal fusion bonding layers may be formed throughout a portion in which the upper and lower cases 400 contact each other, reliability of sealing may be further improved.

A plurality of lithium secondary batteries according to an embodiment of the present invention may be coupled with each other to be used as a secondary battery pack. The secondary battery pack may be used as a power source for medium and large size devices such as a power tool; an electric vehicle (EV) such as a hybrid electric vehicle (HEV), a plug-in hybrid electric vehicle (PHEV), etc.; an electric two-wheel vehicle such as e-bike, e-scooter, etc.; an electric golf cart; an electric truck; an electric commercial vehicle; or the like.

EXAMPLES AND COMPARATIVE EXAMPLES

Preparation Example 1—Preparation of Electrode Assembly

By notching a cathode plate coated with a lithium nickel cobalt manganese oxide cathode active material and an anode plate coated with a graphite anode active material in a suitable size, respectively, laminating the same, and disposing a polyolefin separation film coated with an inorganic layer containing Al between the cathode plate and the anode plate, a cell was fabricated. Tap parts of the cathode and the anode were welded, respectively. A combination of the welded cathode/separation film/anode was put into a pouch, followed by sealing three sides of the pouch except one side into which an electrolyte is injected. In this case, a portion having the tap was included in the sealing portion. After injecting the electrolyte through the remaining one side, the one side was also sealed, followed by impregnation for 12 hours or more. The electrolyte was formed by preparing 1M $LiPF_6$ solution with a mixed solvent of EC/EMC/DEC (25/45/30; volume ratio), and adding 1 percent by weight ('wt. %') of vinylene carbonate (VC), 0.5 wt. % of 1,3-propene sultone (PRS), and 0.5 wt. % of lithium bis(oxalato) borate (LiBOB) thereto, and an electrode assembly was manufactured using the prepared electrolyte.

Example 1

As illustrated in FIG. 1, an electrode tap receptor was prepared by extrusion molding a HDPE resin, and a case was made of PET/Al/PP to manufacture a lithium secondary battery. The electrode tap receptor included a gas barrier layer made of ethylene vinyl alcohol copolymer (EVOH) at a portion which contacts the electrode assembly (prepared according to Preparation Example 1).

Comparative Example 1

A lithium secondary battery was manufactured according to the same procedures as described in Example 1, except that the electrode tap receptor did not include the gas barrier layer.

Comparative Example 2

Processes of disposing an electrode assembly in upper and lower cases so that a portion of the electrode taps attached to the electrode assembly protrude to an outside without electrode tap receptor, then sealing an outer surface of upper and lower pouches were executed to manufacture a lithium secondary battery.

Test Procedure (1) Evaluation of Resistance to Permeability

After fully charging the lithium secondary batteries manufactured according to the example and comparative examples, followed by storing/maintaining the same for 4 weeks at 60° C., a capacity retention ratio compared to full charge, and a rate of increase in internal DC resistance (DC-iR) were measured, and the results are described in Table 1 below.

If the resistance to permeability in the battery is decreased, external air and moisture penetrate into the battery to cause a side reaction with internal materials thereof, and thereby internal DC resistance (DC-iR) may be increased. Therefore, it can be confirmed that, during storing the battery at a high temperature in a fully charged state, as the internal DC resistance (DC-iR) was increased, the resistance to permeability of the battery was decreased.

(2) Measurement of Energy Density Per Volume

Energy density per volume (Wh/L) was measured for each of the lithium secondary batteries manufactured according to the example and comparative examples, and the results are described in Table 1 below.

TABLE 1

| SOC 100%, 60° C. | | Assessment of resistance to permeability | | | | Energy density per volume |
|---|---|---|---|---|---|---|
| | | Week 1 | Week 2 | Week 3 | Week 4 | |
| Example 1 | Capacity retention ratio | 98.3% | 97.2% | 96.9% | 96.4% | 424 Wh/L |
| | Rate of increase in internal DC resistance (DC-iR) (Discharged) | 99.5% | 102.2% | 105.6% | 108.0% | |
| Comparative Example 1 | Capacity retention ratio | 97.7% | 97.1% | 96.4% | 95.9% | 424 Wh/L |
| | Rate of increase in internal DC resistance (DC-iR) (Discharged) | 101.2% | 103.2% | 109.5% | 115.5% | |
| Comparative Example 2 | Capacity retention ratio | 97.9% | 97.6% | 97.1% | 96.8% | 390 Wh/L |
| | Rate of increase in internal DC resistance (DC-iR) (Discharged) | 99.3% | 102.6% | 104.3% | 106.5% | |

Referring to the above Table 1, in a case of Example 1 of the present invention, it could be confirmed that the lithium secondary battery had a large volumetric energy density, and showed only 108.0% of a rate of increase in internal DC resistance (DC-iR) after 4 weeks because the case did not include a sealing part protruding to an outside of the battery, as well as exhibited excellent resistance to permeability due to the gas barrier layer included in the electrode tap receptor.

However, in Comparative Example 1, it could be confirmed that the lithium secondary battery showed 115.5% of a rate of increase in internal DC resistance (DC-iR) after 4 weeks, which was significantly increased compared to Example 1 because the electrode tap receptor did not include the gas barrier layer, and in Comparative Example 2 in which the lithium secondary battery was manufactured by a process of sealing the upper and lower pouches, it could be confirmed that the lithium secondary battery had significantly decreased volumetric energy density compared to Example 1 due to the sealing part included therein.

What is claimed is:

1. A lithium secondary battery comprising:
   an electrode assembly to which an electrode tap is attached;
   an electrode tap receptor configured to house a portion of the electrode assembly;
   wherein the electrode tap receptor comprises a hole through which a portion of the electrode tap protrudes to an outside; and
   a case formed from one sheet configured to surround the electrode assembly,
   wherein an end of the electrode tap receptor and an end of the case partially overlap each other, and the end of the case is disposed over the end of the electrode tap receptor to seal the electrode assembly,
   wherein the case surrounds sides of the electrode assembly to which the electrode tap is not attached,
   wherein the electrode tap receptor includes a gas barrier layer, and
   wherein the electrode tap receptor includes a plurality of electrolyte storage parts formed at an inner surface of the electrode tap receptor,
   wherein each electrolyte storage part has a shape of a groove, and
   wherein the plurality of electrolyte storage parts are formed in a portion in which the electrode tap receptor and the electrode assembly contact each other.

2. The lithium secondary battery according to claim 1, wherein the electrode tap receptor is formed in a plurality of layers, and the gas barrier layer is included in an inner layer of the electrode tap receptor.

3. The lithium secondary battery according to claim 1, wherein the gas barrier layer is formed on a portion which contacts the electrode assembly.

4. The lithium secondary battery according to claim 1, wherein the gas barrier layer includes at least one selected from a group consisting of ethylene-vinyl alcohol copolymer, polyvinylidene chloride, polyvinyl alcohol, nylon, polyamide, polyacrylonitrile, linear low-density polyethylene and ionomer copolymer.

5. The lithium secondary battery according to claim 1, wherein the gas barrier layer includes a metal film, a coating layer made of at least one selected from a group consisting of silica, alumina, rubber, metal, glass and amorphous carbon, or a film having a coating layer in which layered silicate nano particles are dispersed in a polyvinyl alcohol binder.

6. The lithium secondary battery according to claim 1, further comprising: a sub receptor provided on an opposite surface of the electrode assembly relative to one surface to which the electrode tap is attached to house a portion the electrode assembly including the opposite surface,
wherein the sub receptor includes a gas barrier layer.

7. The lithium secondary battery according to claim 1, wherein the electrode tap includes a first electrode tap and a second electrode tap which are attached to surfaces of the electrode assembly facing each other, and
wherein the electrode tap receptor includes a first electrode tap receptor configured to house a portion of the electrode assembly, and a second electrode tap receptor configured to house a portion of the electrode assembly,
wherein the first electrode tap receptor comprises a hole through which a portion of the first electrode tap protrudes to the outside, and the second electrode tap receptor comprises a hole through which a portion of the second electrode tap protrudes to the outside.

8. The lithium secondary battery according to claim 1, wherein a portion in which the case and the electrode tap receptor contact each other is sealed by an adhesive or thermal fusion bonding.

9. The lithium secondary battery according to claim 1, wherein the case is formed of at least one selected from a group consisting of polyethylene, polypropylene, polyethylene terephthalate and polyethylene naphthalate.

* * * * *